(12) United States Patent　　(10) Patent No.: US 9,120,570 B2
Hoisington et al.　　(45) Date of Patent: Sep. 1, 2015

(54) PRECISION AERIAL DELIVERY SYSTEM

(71) Applicant: The Boeing Company, Chicago, IL (US)

(72) Inventors: Zachary Charles Hoisington, Long Beach, CA (US); Blaine Knight Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 37 days.

(21) Appl. No.: 13/776,733

(22) Filed: Feb. 26, 2013

(65) Prior Publication Data

US 2014/0239123 A1　　Aug. 28, 2014

(51) Int. Cl.
　　*B64D 1/16*　　(2006.01)
　　*B64D 1/08*　　(2006.01)
　　*A62C 3/02*　　(2006.01)

(52) U.S. Cl.
　　CPC ............... *B64D 1/16* (2013.01); *A62C 3/0235* (2013.01); *B64D 1/08* (2013.01)

(58) Field of Classification Search
　　USPC ............. 244/137.1, 138 R, 142, 152; 169/53; 701/5, 300
　　See application file for complete search history.

(56) References Cited

U.S. PATENT DOCUMENTS

| | | | |
|---|---|---|---|
| 2,359,573 A * | 10/1944 | Mackay | 169/36 |
| 2,633,920 A * | 4/1953 | Carlson | 169/33 |
| 4,426,051 A * | 1/1984 | Banks et al. | 244/137.3 |
| 6,082,675 A | 7/2000 | Woodall, Jr. et al. | |
| 6,470,805 B1 * | 10/2002 | Woodall et al. | 102/370 |
| 6,587,762 B1 * | 7/2003 | Rooney | 701/16 |
| 6,631,872 B1 * | 10/2003 | Haggard | 244/152 |
| 6,808,144 B1 * | 10/2004 | Nicolai et al. | 244/139 |
| 6,889,942 B2 * | 5/2005 | Preston | 244/152 |
| 7,302,340 B2 * | 11/2007 | Preston | 701/487 |
| 7,690,438 B2 * | 4/2010 | Bordallo Ivarez | 169/47 |
| 7,735,781 B1 | 6/2010 | Moritz et al. | |
| 8,165,731 B2 * | 4/2012 | Akcasu | 701/3 |
| 2003/0197095 A1 * | 10/2003 | Preston | 244/152 |

(Continued)

FOREIGN PATENT DOCUMENTS

WO　　WO03053777 A2　　7/2003

OTHER PUBLICATIONS

International Search Report and Written Opinion of the International Searching Authority mailed on Jul. 30, 2014 for PCT/US2014/012213 application filed on Jan. 20, 2014.

*Primary Examiner* — Joseph W Sanderson
(74) *Attorney, Agent, or Firm* — McDonnell Boehnen Hulbert & Berghoff LLP

(57) ABSTRACT

A system and methods for deployment operations from an airborne vehicle are presented. A designated location of a target is received at a flight control system coupled to a location tracking guided container comprising an agent. The location tracking guided container is ejected at an ejection point from the airborne vehicle approximately above the designated location of the target to descend at a descent rate and a descent angle. A calculated path to the designated location is calculated based on the designated location and a current location of the location tracking guided container. The location tracking guided container is aerodynamically guided by a glide control structure to fly along the calculated path from the ejection point to a load release altitude near the designated location of the target. The agent is delivered to the designated location of the target by releasing the agent at the load release altitude near the designated location.

24 Claims, 5 Drawing Sheets

(56) References Cited

U.S. PATENT DOCUMENTS

| | | | |
|---|---|---|---|
| 2004/0084567 A1* | 5/2004 | Bailey | 244/152 |
| 2004/0153218 A1* | 8/2004 | Lohmiller | 701/3 |
| 2004/0169111 A1* | 9/2004 | Christof | 244/152 |
| 2005/0139363 A1* | 6/2005 | Thomas | 169/30 |
| 2005/0139367 A1* | 6/2005 | Munson, Jr. | 169/85 |
| 2005/0230555 A1* | 10/2005 | Strong | 244/152 |
| 2006/0032984 A1* | 2/2006 | Preston | 244/152 |
| 2007/0018033 A1 | 1/2007 | Fanucci et al. | |
| 2009/0026319 A1* | 1/2009 | Strong | 244/152 |
| 2010/0070111 A1* | 3/2010 | Akcasu | 701/3 |
| 2011/0174931 A1* | 7/2011 | Berland | 244/152 |
| 2013/0048787 A1* | 2/2013 | Riley et al. | 244/137.1 |

\* cited by examiner

PRECISION AERIAL DELIVERY SYSTEM

FIELD

Embodiments of the present disclosure relate generally to guided air-deployable load delivery systems. More particularly, embodiments of the present disclosure relate to guided air-deployable fire-suppression agent delivery systems.

BACKGROUND

Present aerial fire-fighting methods need dedicated aircraft that have little utility for other missions, are limited in fire-fighting capacity due to a small dedicated fleet and severe operational restrictions, need specialized pilot training, are limited to daylight operations, and need to fly at low altitude in very dangerous conditions.

SUMMARY

A system and methods for deployment operations from an airborne vehicle are presented. A designated location of a target is received at a flight control system coupled to a location tracking guided container comprising an agent. The location tracking guided container is ejected at an ejection point from the airborne vehicle approximately above the designated location of the target to descend at a descent rate and a descent angle. A calculated path to the designated location is calculated based on the designated location and a current location of the location tracking guided container. The location tracking guided container is aerodynamically guided by a glide control structure coupled thereto to fly along the calculated path from the ejection point to a load release altitude near the location of the target. The agent is delivered to the designated location of the target by releasing the agent at the load release altitude near the designated location.

In this manner, various embodiments of the disclosure provide a system and method for a guided air-deployable load delivery.

In an embodiment, a method for deployment operations from an airborne vehicle receives a designated location of a target at a flight control system coupled to a location tracking guided container comprising an agent. The method further ejects the location tracking guided container at an ejection point from the airborne vehicle approximately above the designated location of the target to descend at a descent rate and a descent angle. The method further calculates a calculated path to the designated location based on the designated location and a current location of the location tracking guided container. The method further aerodynamically guides the location tracking guided container by a glide control structure coupled thereto to fly along the calculated path from the ejection point to a load release altitude near the location of the target. The method then delivers the agent to the designated location of the target by releasing the agent at the load release altitude near the designated location.

In another embodiment, an air-deployable load delivery system comprises a location tracking guided container and a glide control structure. The location tracking guided container is configured to receive a load, eject from a platform at an ejection altitude approximately above the designated location, descend at a descent rate and a descent angle toward the designated location, and deliver the load to the designated location by releasing the load at a load release altitude near the designated location. The glide control structure is configured to aerodynamically control the location tracking guided container to glide along a calculated path from the ejection point to the designated location.

In a further embodiment, a non-transitory computer readable storage medium comprises computer-executable instructions for air-deploying a load delivery system from a platform. The computer-executable instructions comprises code for receiving a target location via an on-board guidance system coupled to a guided container comprising a load. The computer-executable instructions further comprises code for sensing a current location of the guided container. The computer-executable instructions further comprises code for calculating a calculated path to the target location based on the current location and the target location. The computer-executable instructions further comprises code for aerodynamically guiding the guided container by a glide control structure coupled thereto to glide along a calculated path to a load release altitude near the designated location. The computer-executable instructions further comprises code for delivering the load to the target location by releasing the load at the load release altitude near the target location.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to fire-suppression, fire-suppressants, ducting systems, navigation and guidance systems, aircraft pallet deployment systems, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a non-limiting application, namely, fire-suppression. Embodiments of the disclosure, however, are not limited to such fire-suppression applications, and the techniques described herein may also be utilized in other applications. For example but without limitation, embodiments may be applicable to fertilizing, spraying, emergency supply delivery, medicine delivery, equipment delivery, or other load delivery application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
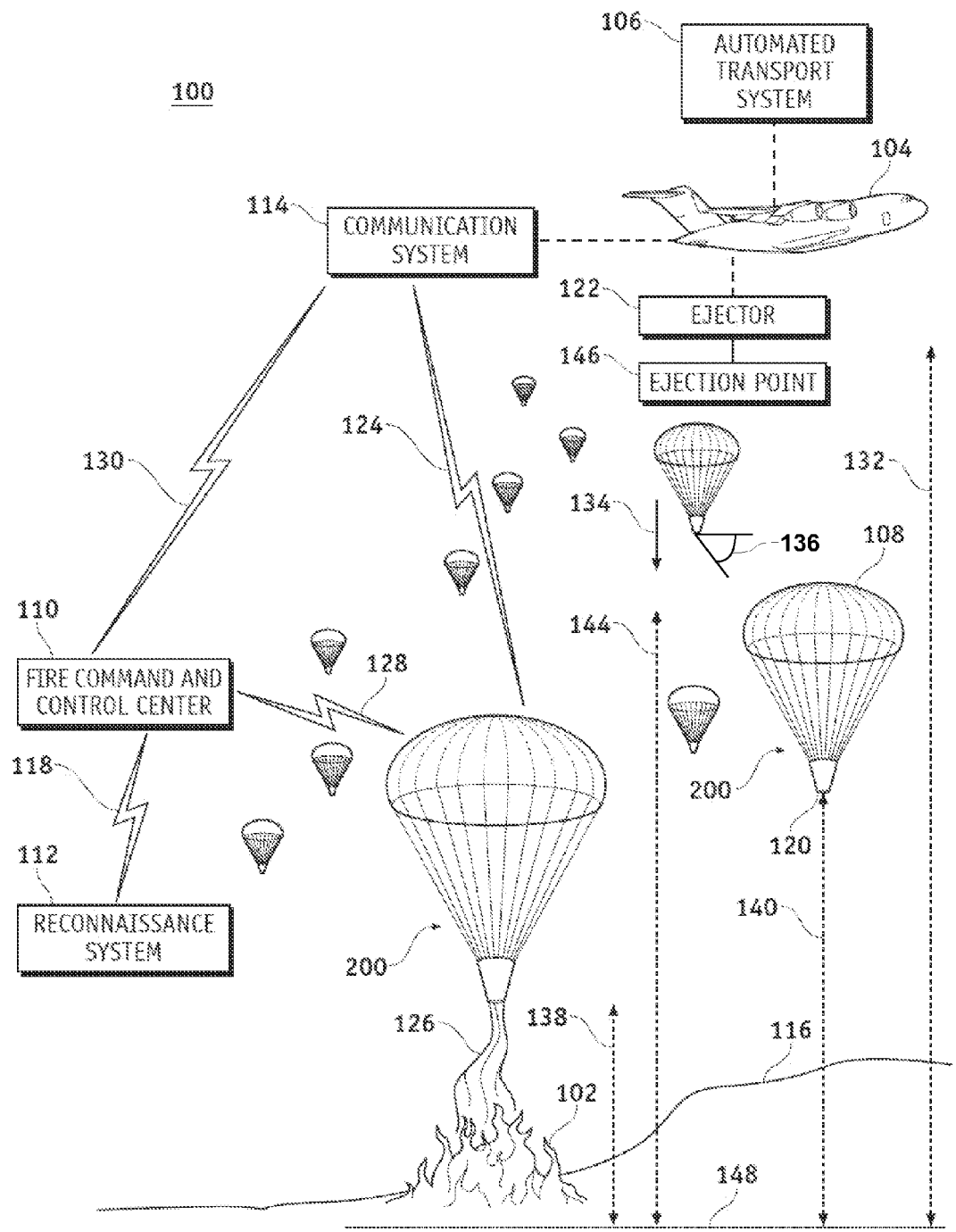
FIG. 1 is an illustration of an operational environment of an air-deployable fire-suppressant agent delivery system according to the embodiments of the disclosure.

FIG. 1 is an illustration of an operational environment 100 (environment 100) of an air-deployable fire-suppressant agent delivery system 200 (also system 200, FIG. 2) according to an embodiments of the disclosure. The environment 100 may comprise regional bases (not shown) for an aircraft 104, local fire-fighting bases (not shown) with water or retardant supply systems and cargo handling equipment, the aircraft 104, the system 200 ("Water Chute" 200), a fire command and control center 110, and a reconnaissance system 112.

The aircraft 104 comprises an ejector 122, an aircraft communication system 114, and an automated transport system 106 and is configured to air-drop a plurality of systems 200. Although an airborne aircraft such as the aircraft 104 is used for air-deployment of a fire retardant delivery system such as the system 200, the embodiments are not limited to an airborne aircraft and other platforms may also be used for air-deployment of the system 200.

For example but without limitation, an airborne vehicle, a bridge, a tower, a roof top of a high rise building, or other platform capable of air-deployment from an ejection altitude 132 above a fire site 116 may also be used for air-deployment of the system 200. The ejection altitude 132 may be defined based on the context in which it is used. The ejection altitude 132 may be defined as a height of the platform in terms of a distance (e.g., altitude) above a ground level (AGL), an altitude of an aircraft from mean sea level (MSL), or other measure.

For example but without limitation, for air-drop from an aircraft, the ejection altitude 132 or high ejection altitude 132 may refer to a height from about 305 m (about 1000 ft.) above ground level (AGL) to about 10668 m (about 35000 ft.) above mean sea level (MSL). For another example but without limitation, the ejection altitude 132 may comprise, about 30 m (about 98 ft.) to about 300 m (about 984 ft) for bridges, about 600 m (about 1968 ft.) to about 900 m (about 2592 ft.) for skyscrapers, about 5000 m (about 16404 ft.) to about 9000 m (about 29527 ft.) for air-drop from an aircraft, or other ejection altitude 132 suitable for operation of the system 200. Also, although a fire-suppressant agent is used as an example of a load, the system 200 may also deliver other loads such as, but without limitation, fertilizer, food, medicine, equipment, or other load to a designated location.

The system 200 is configured to be air-dropped at the ejection altitude 132, descend to an intermediate altitude 140, and drop the fire-suppressant agent 126 to a designated location 116 of a fire 102 (targeted location) from a load release altitude 138. Alternatively, the system 200 may air-drop the fire-suppressant agent 126 at an abort altitude 144, if the system 200 indicates conditions may be non-optimal to drop the fire-suppressant agent 126 at the targeted location. The ejection altitude 132, the load release altitude 138, the intermediate altitude 140, and the abort altitude 144 may be measured relative to a reference 148 such as, but without limitation, AGL, MSL, or other reference suitable for measuring an altitude.

The system 200 comprises a location tracking guided fire-suppressant container 120 (container 120) that is substantially precisely guided to the fire 102 via a glide control structure such as a controllable parachute 108. The controllable parachute 108 and the container 120 may be, for example but without limitation, recoverable, disposable, or somewhat fireproof. Loads of water or other fire retardant may be delivered via each of the systems 200. The system 200 may be applied to large-scale forest fires as well as much smaller structures fires in urban areas. A more detailed description of the system 200 is provided below in the context of discussion of FIG. 2.

Aircraft, airborne vehicle, and airborne aircraft may be used interchangeably in this document. Also, a location tracking guided fire-suppressant container, a container, and a guided container may be used interchangeably in this document.

In operation, the fire 102 may be spotted at the fire site 116, and the local fire-fighting bases are identified. The aircraft 104 are called in from their regional bases to the local fire-fighting bases. The aircraft 104 arrive with many of the systems 200 in an unloaded state. Retardant-loading teams and cargo handling equipment may be called in from additional local bases or perhaps already located at the fire-fighting base. While the systems 200 are removed from the aircraft 104 and loaded, one or more reconnaissance system(s) 112 can be engaged to provide precise information about the fire 102 to the fire command and control center 110.

The fire command and control center 110 may then be engaged to direct the fire-fighting operation. The fire command and control center 110 may be located remotely, and is configured to receive intelligence from the reconnaissance system(s) 112 via a communication link 118 to direct the fire-fighting operation. The fire command and control center 110 is communicatively coupled to the aircraft communication system 114 via a communication link 130.

After each of the containers 120 is filled with fire-suppressant agent 126 (load 126), one planeload is loaded into each aircraft 104. Each of the containers 120 of the system 200 is communicatively linked to the aircraft communication system 114 via a communication link 124. Each of the containers 120 of the system 200 may also be communicatively linked to the fire command and control center 110 via a communication link 128. The communication link 124 and the communication link 128 allow each of the systems 200 to update their target information such as location 116 (fire site 116) of the fire 102 in real-time, even just before air-drop of the system 200. For example, the fire command and control center 110 sends the target sites 116 information to the aircraft communication system 114 via the communication link 130. The aircraft communication system 114 can then allocate the target sites 116 to individual containers 120 via the communication link 124.

The aircraft 104 take off one after another toward the fire site 116, and climb to a safe altitude to reach the ejection altitude 132. When the aircraft 104 is approximately above the fire site 116, the automated transport system 106 is engaged on the airborne aircraft 104 to select and move the container 120 to the ejector 122. In general, some cargo aircraft payloads can always be in position to be air-dropped—they may not necessarily be moved into position. Typically, an act of "ejection" involves releasing a small parachute (not shown) tied to a deployment container such as a pallet (not shown) containing the system 200. The small parachute may be ejected while unlocking the pallet from a floor system. The small parachute then drags the pallet out from a back end of the aircraft 104.

When the aircraft 104 is approximately above the fire site 116, the system 200 is ejected by the ejector 122 at the ejection point 146 and air-dropped from the ejection altitude 132. The controllable parachute 108 opens and the systems 200 are guided to their respective substantially precise target such as the location 116 of the fire 102 at a high descent rate 134 and a medium-to-high descent angle 136. The high descent rate 134 may range from, for example but without limitation, about 30 MPH to about 200 MPH or other suitable descent rate. The medium to high descent angle 136 may range from, for example but without limitation, about 20 to about 90 degrees. A high descent angle 136 is nearly vertical. A low descent angle 136 is nearly horizontal. The system 200 may descend quite steeply, for example but without limitation, from about a 20 degree angle to about vertical.

The automated transport system 106 may be engaged to select and move one or more additional containers 120 to be ejected from the airborne vehicle 104. It is possible to air-drop one or more containers 120 substantially simultaneously. The containers 120 located at an aft end of the aircraft 104 are configured to air-drop first—the rest of containers 120 air-drop in order. It is possible to eject multiple, independently-targeted containers 120 at a substantially same time. For example, a first three of the containers 120 may be ejected and a minute later five more are launched. Others containers 120 may remain onboard indefinitely. Some aircraft, may have two or more rows of containers 120. The containers 120 may be dropped in more or less any order except, for example, as above, the rear-most containers 120 may be configured to air-drop first.

In existing cargo aircraft with air-drop capability, cargo is stored within the fuselage in one or more columns (also known colloquially as "sticks"). In the existing cargo aircraft, for each column, the aft-most container simply must be ejected first, and the remaining pallets are ejected in order, with the rear-most container always going first. This is generally done because a more-forward pallet generally cannot pass a more-rearward pallet. Existing cargo airplanes generally do not have a means to move cargo from one column to a neighboring column. Thus, the containers generally cannot be dropped in any order in existing aircraft.

In contrast, because notionally, containers 120 can be substantially identical, it generally may not matter which of the containers 120 is ejected first. For efficiency, the targets sites 116 of the containers 120 can be allocated so that an order of ejection is aligned with a respective order of the target sites 116. This may minimize the required descent angle 136 for the containers 120 and improve accuracy or reliability of reaching the target site 116.

One or more additional containers 120 may be dropped from the airborne vehicle 104 at the load release altitude 138 in response to one or more reconnaissance system(s) 112 indicating updated information comprising preferred targets on or near the designated location 116 of the fire 102.

One or more glide control structure 242 (in FIG. 2) such as the controllable parachute(s) 108 may be deployed on the containers 120 respectively to assist in a guidance of the container 120 allowing the airborne vehicle 104 to fly a path (offset path) offset from the target site 116. This may also prevent overcrowding of a sky area near the designated location 116 of the fire 102.

Staggered drops from the airborne vehicle 104 of one or more additional containers 120 may be performed in response to last minute intelligence information received from one or more reconnaissance system(s) 112 that are in or in proximity of the designated location 116 of the fire 102.

One or more of the glide control structure 242 on the one or more additional containers 120 may be deployed respectively to assist in steering by guidance of the containers 120.

After an air-drop, the aircraft 104 can return to the local fire-fighting base where a fresh load of systems 200 may have been prepared and ready to load to the aircraft 104. Loading can be accomplished quickly, while the aircraft 104 is serviced. This cycle may be repeated until the fire 102 is extinguished or satisfactorily retarded.

Some advantages of the system 200 can be as follows:

Safety. Flight crews can air-drop the system 200 from a safe altitude during straight-and-level flight using ordinary air-drop procedures. Also, due to greater capacity and increased drop accuracy, fewer flights and flight crews may be needed.

Crew and aircraft availability. Because ordinary military air-drop procedures can be used and because of low risk, use of active or reserve military aircraft may be possible. Further, it may be possible for fire-fighting missions to "count" as training missions.

Increased productivity. One large size airplane may precisely deliver as much water or other fire redundant as about 80 individual helicopters over a short period of time.

Accuracy. Using an automated, navigation and guidance system such as a Global Position System (GPS), the controllable parachute(s) 108 can accurately hit hot spots through smoke or over rugged terrain that aren't accessible by the aircraft 104. In contrast to present systems, delivery accuracy can be insensitive to aircraft altitude and speed as well as precision of the system 200 ejection location.

24/7 operation. Day and nighttime operation is enabled by a safe, high-altitude drop procedure, and modern sensing and guidance methods.

Strike anywhere. Any spot in the fire 102 may be targeted—smoke, heat, wind, turbulence and geography are not constraints in targeting.

Greatly reduced complications related to overcrowding sky near the fire 102.

Very quick access to the fire 102 over a large area by delivering large amounts of fire retardant or water from a Mach 0.75 aircraft.

Last minute organized updates to the targets such as the fire 102 of the fire retardant or water drops.

Figure 2:
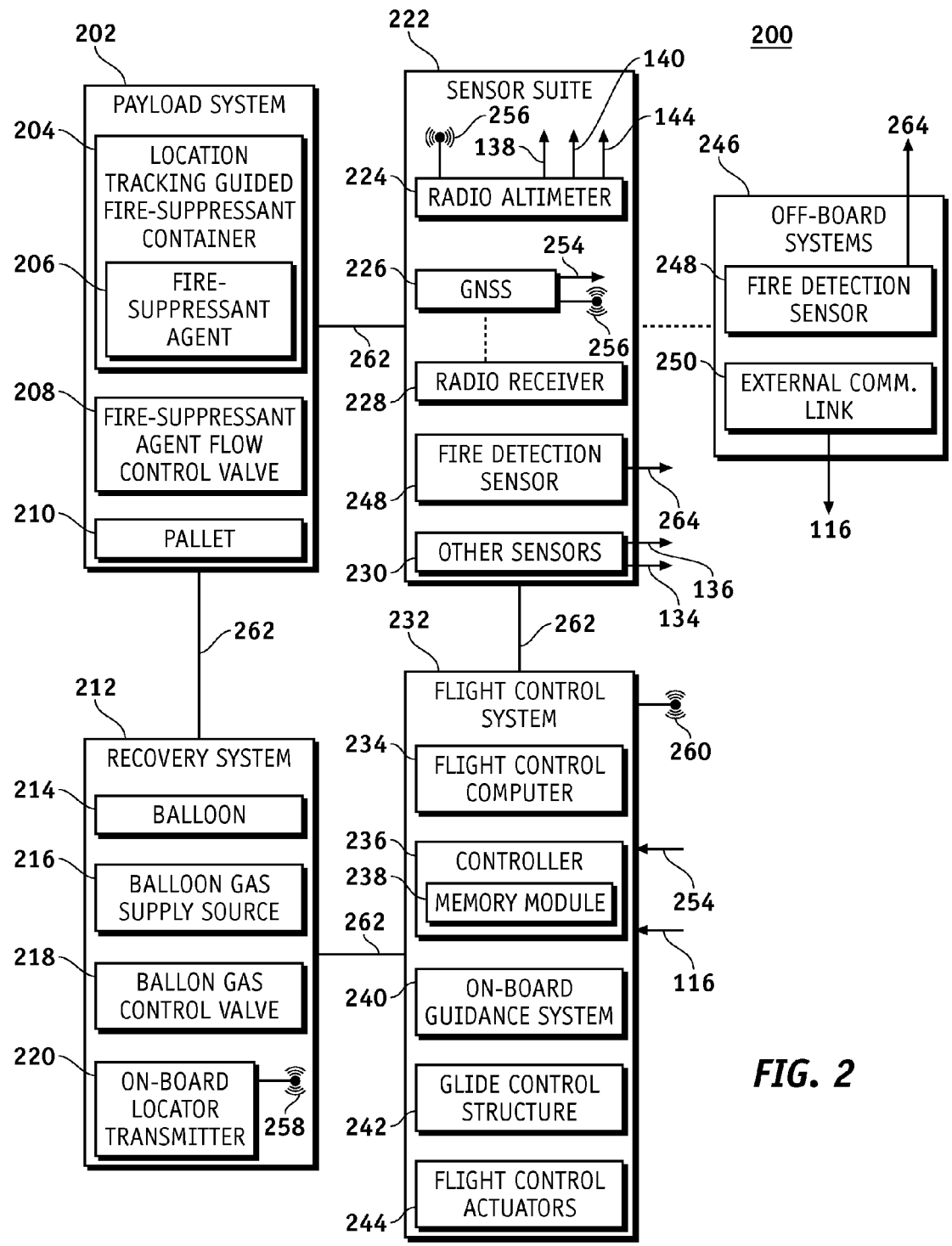
FIG. 2 is an illustration of an exemplary functional block diagram of an air-deployable fire-suppressant agent delivery system according to an embodiment of the disclosure.

FIG. 2 is an illustration of an exemplary functional block diagram of the air-deployable fire-suppressant agent delivery system 200 (system 200) according to an embodiment of the disclosure. The system 200 may comprise a payload system 202, a recovery system 212, a sensor suite 222, a flight control system 232, and one or more off-board systems 246.

The payload system 202 may comprise a location tracking guided fire-suppressant container 204 comprising a fire-suppressant agent 206, a fire-suppressant agent flow control valve 208, and a pallet 210.

The container 204 (120 in FIG. 1) is configured to receive and carry a load such as the fire-suppressant agent 206 (load 206, 126 in FIG. 1) and eject at an ejection point 146 from a platform such as the airborne aircraft 104 at a high ejection altitude 132 approximately above a designated location such as the location 116 of the fire 102 (FIG. 1). The container 204 is also configured to descend at a descent rate 134 and a descent angle 136 toward the designated location 116, and deliver the load 206 to the designated location 116 by releasing the load 206 at a release altitude 138 near the designated location 116.

The container 204 may have, for example but without limitation, about 2000 lb. capacity or other suitable capacity, and is configured to load quickly and easily, be leak proof, and be rapidly opened on command to dump the fire-suppressant agent 206. For example, the container 204 may comprise a large cardboard box. The container 204 is configured to deliver the fire-suppressant agent 206 to the designated location 116 of the fire 102 by releasing the fire-suppressant agent 206 at the release altitude 138 near the designated location 116 of the fire 102.

The container 204 may comprise, for example but without limitation, an On-Board Inert Gas Generation System (OBIGGS), an HFC-125 supply source, a Pentafluoroethane ($C_{F3}CH_{F2}$) supply source, a Nitrogen supply source, an Argon supply source, a Helium supply source, an aerosolized liquid mist supply source, a FK 5-1-12 ($C_6F_{12}O$) supply source, a water supply source, a Halon supply source, ammonium sulfate source, ammonium polyphosphate source, attapulgite clay source, diammonium phosphate source, guar gum source, fertilizers source or other supply source.

Accordingly, the fire-suppressant agent 206 may comprise active agents or inactive agents, such as but without limitation, gaseous chemical agents such as: HFC-125 or Pentafluoroethane ($CF_3CHF_2$); inert gases and semi-inert gases such as Nitrogen, Argon or Helium; aerosolized liquid mists such as FK 5-1-12 fire protection fluid ($C_6F_{12}O$) (e.g., commercially available from 3M) or water ($H_2O$); Halon 1301 ($CF_3Br$); a mixture thereof, ammonium sulfate, ammonium polyphosphate, attapulgite clay, diammonium phosphate, guar gum, fertilizers, and/or other fire-suppression agent.

The fire-suppression agent flow-control valve 208 is configured to be in an open state or a closed state depending on presence or absence of fire/smoke respectively. The fire-suppression agent flow-control valve 208 may comprise, for example but without limitation, a ball valve, a butterfly valve, or other valve. The fire-suppression agent flow-control valve 208 may be actuated, for example but without limitation, electronically, via an actuator, via a gear mechanism, in conjunction with one or more components of the system 200, or other mechanism.

An actuator or actuator mechanism coupled to the fire-suppression agent flow-control valve 208 may comprise, for example but without limitation, a hydraulic actuator, a piezoelectric actuator, a spring-loaded mechanism tied or other actuator. Such an actuator may be used for actuation of the fire-suppression agent flow-control valve 208. In an embodiment, the fire-suppression agent flow-control valve 208 comprises a pyrotechnic valve. A pyrotechnic valve may comprise a valve that opens due to a combustive process and remains open until maintenance replaces the valve. An advantage of the pyrotechnic valve is durability and reliability, and an ability to reliably contain a high pressure for substantially long periods of time until opened.

The fire-suppression agent flow-control valve 208 is operable to control a flow rate of the fire-suppression agent 206 based on an operational conditions. For example, a controller 236 provides logic such that a flow rate of the fire-suppression agent 206 distributed during a descent is increased. The controller 236 can increase the flow rate of the fire-suppression agent 206 by various control means based on various operational conditions.

For example, the controller 236 increases the flow rate of the fire-suppression agent 206 by controlling the fire-suppression agent flow-control valve 208 based on the operational conditions comprising, for example but without limitation, the intermediate altitude 140, the descent rate 134, the descent angle 136, a heading of the system 200, an air speed of the system 200, a Mach number of the system 200, an air pressure, a rate of change of air pressure, a temperature, or other parameter. The controller 236 may shape the discharge of the fire-suppressant agent 206 in a linear distribution.

In one embodiment, the location tracking guided fire-suppressant container 204 (container 204) may be opened all at once at a pre-determined altitude such as the load release altitude 138 above the target site 116. Selection of the load release altitude 138, in combination with a nature of contents of the container 204, can be used to determine the distribution pattern of the contents on the target site 116. If the container 204 is opened at a higher altitude, the fire-suppressant agent 206 may spread out more, and if the container 204 is opened at a lower altitude, the fire-suppressant agent 206 may spread out less.

In one embodiment, the location tracking guided fire-suppressant container 204 may be, for example, a large, cardboard box with a large plastic bag inside. Control of release of the fire-suppressant agent 206 may involve rapidly opening the cardboard box and allowing the plastic bag to burst from the pressure of the fire-suppressant agent 206. The cardboard box may be opened by initiating tears in the corner joints, for example. In this example, use of the fire-suppression agent flow-control valve 208 may be omitted.

The pallet 210 is configured to engage a rail system of the automated transport system 106 than can be used in an aircraft such as a conventional military cargo aircraft. The pallet 210 may be integrated with the container 204.

The recovery system 212 may comprise a balloon 214, a balloon gas supply source 216, a balloon gas control valve 218, and an on-board locator transmitter 220.

The balloon 214 may be configured to lift the system 200 up and away from the fire site 16, for example but without limitation, after the fire-suppressant agent 206 is delivered. The balloon 214 may comprise a lightweight buoyant gas such as, but without limitation, helium, hydrogen, or other buoyant gas. Hydrogen may be generated by a chemical process rather than being stored in a tank as a compressed gas. Balloon and buoyant balloon may be used interchangeably in this document.

The balloon gas supply source 216 is configured to supply gas to the balloon 214.

The balloon gas control valve 218 is configured under control of the controller 236 to control flow rate of the gas from the balloon gas supply source 216 to the balloon 214 based on, for example but without limitation, an altitude of the system 200 such as the intermediate altitude 140, an ascent rate, an air speed of the system 200, a heading angle of the system 200, a Mach number of the system 200, an air pressure, a rate of change of air pressure, a temperature, or other parameter and or operational condition. For example, the controller 236 provides logic such that a flow rate of gas is increased to the balloon 214 to allow the system 200 ascend to a certain altitude and flow rate of the gas is decreased to allow the system 200 to land at a location for later recovery.

The balloon gas control valve 218 may comprise, for example but without limitation, a ball valve, a butterfly valve, or other valve. The balloon gas control valve 218 may be actuated, for example but without limitation, electronically, via an actuator, via a gear mechanism, in conjunction with one or more components of the system 200, or other mechanism. An actuator or actuator mechanism coupled to the balloon gas control valve 218 may comprise similar actuator as explained above for the fire-suppression agent flow-control valve 208.

The on-board locator transmitter 220 may be configured to continuously transmit a current location 254 of the container 204 received at the flight control computer 234 so that the system 200 may be recovered if necessary. For example, the container 204 may be blown downwind after the fire-suppressant agent 206 is dropped. As the container 204 blows, its current location 254 (position) is intermittently transmitted by the on-board locator transmitter 220 to the fire command and control center 110.

When the container 204 reaches a pre-determined region, the balloon 214 may be deflated and the current location 254 continues to be transmitted by the on-board locator transmitter 220 to the fire command and control center 110. The on-board locator transmitter 220 may be a low-power locator transmitter so that the current location 254 can be transmitted for a long period of time allowing a more probable recovery for the system 200. The on-board locator transmitter 220 may comprise an antenna 258 to send and receive communication signals, for example, indicating the current location 254 of the system 200.

The sensor suite 222 may comprise a radar altimeter 224, a global navigation satellite system 226, a radio receiver 228, a fire detection sensor 248, and other sensors 230.

The radar altimeter 224 is configured to measure the load release altitude 138, the intermediate altitude 140, the abort altitude 144 and other altitude of the system 200. The radar altimeter 224 may comprise an antenna 256 to send and receive communication signals indicative of altitudes of the system 200. In some embodiments, where a higher resolution of the altitudes than that obtained by the Global Navigation Satellite System (GNSS) 226 is not needed, the radar altimeter 224 may be omitted.

The Global Navigation Satellite System 226 is configured to estimate the current location 254 of the container 204. The Global Navigation Satellite System 226 comprises a satellite receiver, e.g., in the radio receiver 228. The Global Navigation Satellite System 226 may receive satellite signals to triangulate latitude, longitude and altitude of the container 204 to estimate the current location 254 of the container 204.

The radio receiver 228 may also comprise the (same) antenna 256 or other antenna to send and receive communication signals such as satellite signals.

The other sensors 230 may comprise sensors configured to sense various parameters suitable for operation of the system 200.

The flight control system 232 may comprise a flight control computer 234, the controller 236 comprising a memory module 238, an on-board guidance system 240, a glide control structure 242, and flight control actuators 244.

Under control of controller 236, the flight control computer 234 is configured to direct the glide control structure 242 to guide the system 200 to the location 116 of the fire 102. The flight control computer 234 actuates the flight control actuator 244 to control the glide control structure 242 based on the location 116 of the fire 102, the intermediate altitude 140, the load release altitude 138, a heading, the descent rate 134, the descent angle 136, an airspeed of the system 200, a Mach number of the system 200, a pressure, a rate of change of pressure, a temperature, or other parameter.

The flight control computer 234 is configured to support function of the system 200. The flight control computer 234 is also configured to store the location 116 of the fire 102 (target 102) received via the external communication link 250 and/or communicated by the on-board guidance system 240. The flight control computer 234 is configured to sense the present location 254 (current location 254) and state of the system 200 (e.g., airspeed, descent rate, heading, altitude, etc.) received from the sensor suite 222. The flight control computer 234 then computes a feasible calculated path to the designated location 116 of the fire 102 (destination) based on the current location 254 and the designated location 116.

The flight control computer 234 then controls the flight control actuators 244 and thus the glide control structure 242 to guide the system 200 along the calculated path. The present location 254 and the state of the system 200 along with the controls of the flight control actuators 244 are repeatedly updated to guide the system 200 to the location 116 of the fire 102 via the on-board guidance system 240. Under control of the controller 236, the flight control computer 234 is configured to release the container 204 at the load release altitude 138 when the system 200 is arrived at or near the designated location 116 of the fire 102.

The controller 236 manages/controls operation of the system 200. For example, the controller 236 controls the fire-suppression agent flow-control valve(s) 208 based on a presence or an absence of the fire 102. For another example, the controller 236 directs distribution of the fire-suppression agent 206 in response to receiving the fire-warning signal 264 from the fire/smoke detection sensor 248.

For another example, the controller 236 may direct the flight control computer 234 to guide the glide control structure 242 via the flight control actuator 244 to the designated location 116 of the fire 102. The controller 236 may open the fire-suppression agent flow-control valve 208 by sending a signal to the actuator mechanism (not shown) commanding the fire-suppression agent flow-control valve 208 to open at the load release altitude 138 above the designated location 116 of the fire 102 or at other location and altitude.

The controller 236 may be implemented as, for example but without limitation, as part of an aircraft-computing module, a centralized aircraft processor, a subsystem-computing module devoted to the system 200, or other configuration. The controller 236 may comprise, for example but without limitation, a software-controlled device, electronic, mechanical, electro-mechanical, fluidic, and other device.

The controller 236 comprises processing logic that is configured to carry out the functions, techniques, and processing tasks associated with the operation of the system 200. In particular, the processing logic is configured to support the system 200 described herein. The controller 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices comprising hardware and/or software, e.g., a combination of a digital signal processor and a microprocessor, a plurality of microprocessors, one or more microprocessors in conjunction with a digital signal processor core, or other configuration.

The memory module 238 may comprise a data storage area with memory formatted to support the operation of the system 200. The memory module 238 is configured to store, maintain, and provide data as needed to support the functionality of the system 200. For example, the memory module 408 may store the operational conditions, flight configuration data, data pertaining to state of air-drop, the designated location 116 of the target 102, the ejection altitude 132, the load release altitude 138, the intermediate altitude 140, the abort attitude 144, the and/or other data.

In some embodiments, the memory module 238 may comprise, for example but without limitation, a non-volatile storage device (e.g., non-volatile semiconductor memory, hard disk device, optical disk device, and the like), a random access storage device (for example, SRAM, DRAM), or any other form of storage medium known in the art.

The memory module 238 may be coupled to the controller 236 and configured to store, for example but without limitation, a database, a dynamically updating database containing a table for updating the database, or other application. The memory module 238 may also store a computer program that is executed by the controller 236 an operating system, an application program, tentative data used in executing a program, or other application.

The memory module 238 may be coupled to the controller 236 such that the controller 236 can read information from and write information to the memory module 238. For example, the controller 236 may access the memory module 238 to access air speed, the descent rate 134, the descent angle 136, a heading, a Mach number, the load release altitude 138, the ejection altitude 132, the load release altitude 138, the intermediate altitude 140, the abort attitude 144, the target location 116, or other sensor data. For another example, the controller 236 accesses the sensor suite 222 directly to access the sensor data. As an example, the controller 236 and the memory module 238 may reside in respective application specific integrated circuits (ASICs). The memory module 238 may also be integrated into the controller 236. In an embodiment, the memory module 238 may comprise a cache memory for storing temporary variables or other intermediate information during execution of instructions to be executed by the controller 236.

The controller 236 may be activated, for example but without limitation, by receiving an activation signal from the fire/smoke detector sensor 248, an activation signal from flight control computer 234, or an activation signal from another type of device.

The on-board guidance system 240 is configured to receive the designated location 116 of the fire 102 from the off-board systems 246. As mentioned above in the context of discussion of FIG. 1, the system 200 is communicatively linked to the aircraft communication system 114 via the communication link 124 and to the fire command and control center 110 via the communication link 128 so that their targets such as the designated location 116 of the fire 102 is updated in real-time, even just before the air-drop.

The designated location 116 of the fire 102 is transmitted to the on-board guidance system 240 by the command and control center 110 or by the aircraft communication system 114 via, for example, the external communication links 250. In this manner, the designated location 116 of the fire 102 is known to the on-board guidance system 240.

The on-board guidance system 240 communicates the designated location 116 of the fire 102 to the flight control computer 234 and the controller 236. The on-board guidance system 240 then determines via the flight control computer 234 what flight path to guide the system 200 to the designated location 116 of the fire 102.

The glide control structure 242 is configured to provide aerodynamic forces to control a direction and/or the descent rate 134 of the system 200 to "fly" the container 204 from the ejection point 146 to the designated location 116 of the target 102. In this manner, the glide control structure 242 aerodynamically guides the container 204 to fly along the calculated path from the ejection point 146 to an altitude such as the load release altitude 138 near the designated location 116 of the fire 102.

The glide control structure 242 may comprise, for example but without limitation, a wing, a steerable round parachute, a rectangular ram-air parachute, a Rogallo wing, an inflatable device such as a spherical balloon or other form of an inflatable device, and/or other glide control structure. The glide control structure 242 may be differentiated by cost, ability to be compacted, and glide ratio. A steerable round parachute can have a lift over drag ratio (L/D) of around 0.8. A Rogallo wing has an L/D of about 2.5, and ram-air parachutes have L/D's from 2 to 6.

For example, the system 200 may be ejected by a force of a small parachute. This same parachute may be used to deploy the glide control structure 242 (parachute, balloon, etc.). The term "deploy" may mean to "pull out" or "extend". In some embodiments, when a balloon-like inflatable device is used, the glide control structure 242 may be deployed by inflation. In a case of a parachute device, the glide control structure 242 may be deployed by pull out or extension.

The glide control structure 242 begins its descent to a targeted destination such as the designated location 116 of the fire 102. Over the target area 116, the entire fire-suppressant agent 206 (or a partial fire-suppressant 206) of the system 200 is air-dropped. A fire site, a designated location, a target area, and a fire location, may be used interchangeably in this document. Also a target and a fire may be used interchangeably in this document.

The flight control actuator 244 may comprise, for example but without limitation, a hydraulic actuator, an electromechanical actuator, a piezoelectric actuator, a spring-loaded mechanism, or other actuator.

The off-board systems 246 may comprise the fire detection sensors 248, and an external communication link 250. The off-board systems 246 may comprise, for example but without limitation, another air vehicle, a satellite, ground-based system such as fire observation tower, or other off-board system.

The fire detection sensor 248 is configured to sense the designated location 116 of the fire 102. The fire detection sensor 248 may be part of the off-board systems 246. The fire detection sensor 248 may comprise a device for detecting fire such as, but without limitation, a smoke sensor, a heat sensor, an infrared sensor, and/or other device. The fire detection sensor 248 generates the fire-warning signal 264 indicating presence and absence of fire/smoke at the location 116 of the fire 102. Fire detection sensor and fire/smoke detection sensor may be used interchangeably in this document.

Alternatively or in addition, the fire detection sensor 248 may be coupled to the system 200 as an on-board fire detection sensor. In this manner, the fire/smoke detector sensor 248 may be coupled by an electrical and/or optical signal to the controller 236 to provide an on-board fire detection sensor.

The external communication link 250 is configured to communicate information pertaining to the designated location of the target 102, and other data to the sensor suite 222. The external communication link 250 may comprise the communication link 124, the communication link 128, and other communication link suitable for operation of the system 200 communicating with the off-board systems 246.

In operation, the container 204 (Water Chute 204) can be taken from the aircraft 104 and placed on a K-loader or similar cargo handling system. The container 204 may then be filled with the fire-suppressant agent 206. When a ship-load of the container 204 is filled they are loaded into the aircraft 104. Alternatively, the container 204 may be staged at fire base airports well ahead of time. They may be delivered in this case by trucks or other vehicles. In this manner, the aircraft 104 may arrive at the fire base airport without the container 204.

Once the system 200 are loaded, one planeload is loaded into each aircraft 104. The system 200 is linked to the aircraft communication system 114 and to the fire command and control center 110 so that their targets such as location 116 of the fire 102 can be updated in real-time, even just before the air-drop.

The glide control structure 242 begins its descent to the target 102. Over the target area 116, the entire fire-suppressant agent 206 (or a partial fire-suppressant agent 206) of system 200 is air-dropped via the ejector 122 (FIG. 1).

In contrast to existing systems, the system 200 can have a very high descent rate of, for example, about 100 MPH. This means that a size of the glide control structure 242 can be much smaller than for systems where a ground landing must be survivable. It is desirable for a parachute system to provide some glide with descent so that the cross-range capability of the parachute permits less precise air-drop positioning. Furthermore, in contrast to existing systems (e.g., military guided parachute systems), generally no one would be shooting at the aircraft 104, thus the aircraft 104 can directly fly over the target area 116, or very near to the target area 116. This in turn means that only a very modest glide angle is required of the system 200. A modest glide angle (e.g., about 20 to about 90 degrees), combined with a high rate of descent (e.g., about 30 to about 200 MPH) has a potential to increase an accuracy of the system 200 in wind and turbulence, and reduce a cost of the system 200, especially in comparison with other systems.

The system 200 descends to the target 102, using the glide control structure 242 to follow a track under control of the flight control computer 234. At some distance above the target 102, perhaps 100 feet or so, the Global Navigation Satellite System 226 (and the radar altimeter 22 (if higher resolution of the altitude 138/140/144 is needed)) and the flight control computer 234 work together to command the container 204 to release the fire-suppressant agent 206. This allows the fire-suppressant agent 206 to disperse to a calibrated extent as opposed to hitting in a concentrated spot like a big, encapsulated "water" balloon. In some embodiments, a discharge of the fire suppressant 206 may be shaped so to be substantially linear, which may be advantageous. In comparison with existing water or other fire retardant dropped from airplanes, the system 200 load may have less kinetic energy and associated destructive force because a forward speed of the system 200 is less.

In some embodiments, the system 200 may be recovered using the recovery system 212. Approximately coincident with the opening of the container 204, the buoyant balloon 214 may be rapidly inflated by the balloon gas supply source 216. The buoyant balloon 214 (balloon 214) may be of sufficient size that the buoyant balloon 214 lifts the now-empty system 200 up and away from the fire 102. The container 204 is then blown downwind. As the container 204 blows downwind, its current position/current location 254 is intermittently transmitted by the on-board locator transmitter 220 to the fire command and control center 110. When the container 204 reaches a pre-determined region, the balloon 214 is deflated. The on-board locator transmitter 220 continues to broadcast current location 254 so that the container 204 may be located and recovered. Current position, current location and present location may be used interchangeably in this document.

In another embodiment, the system 200 may land on the target site 116. Some or all of the container 204 may be recovered at a later time. Use of fireproof or fire-resistant material may increase a fraction that can be recovered. The container 204 may be landed in its own puddle, safe from the fire 102.

In some embodiments, the system 200 may comprise any number of processor modules, any number processing modules, any number of memory modules, any number of transmitter modules, and any number of receiver modules suitable for their operation described herein. The illustrated system 200 depicts a simple embodiment for ease of description. These and other elements of the system 200 are interconnected together, allowing communication between the various elements of system 200. In one embodiment, these and other elements of the system 200 may be interconnected together via a respective data communication bus 262.

A transmitter module and a receiver module may be located in the controller 236 coupled to a shared antenna 260. Although in a simple module only one shared antenna 260 may be provided, more sophisticated modules may be provided with multiple and/or more complex antenna configurations. Additionally, although not shown in this FIG. 2, those skilled in the art will recognize that a transmitter may transmit to more than one receiver, and that multiple transmitters may transmit to a same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 3A:
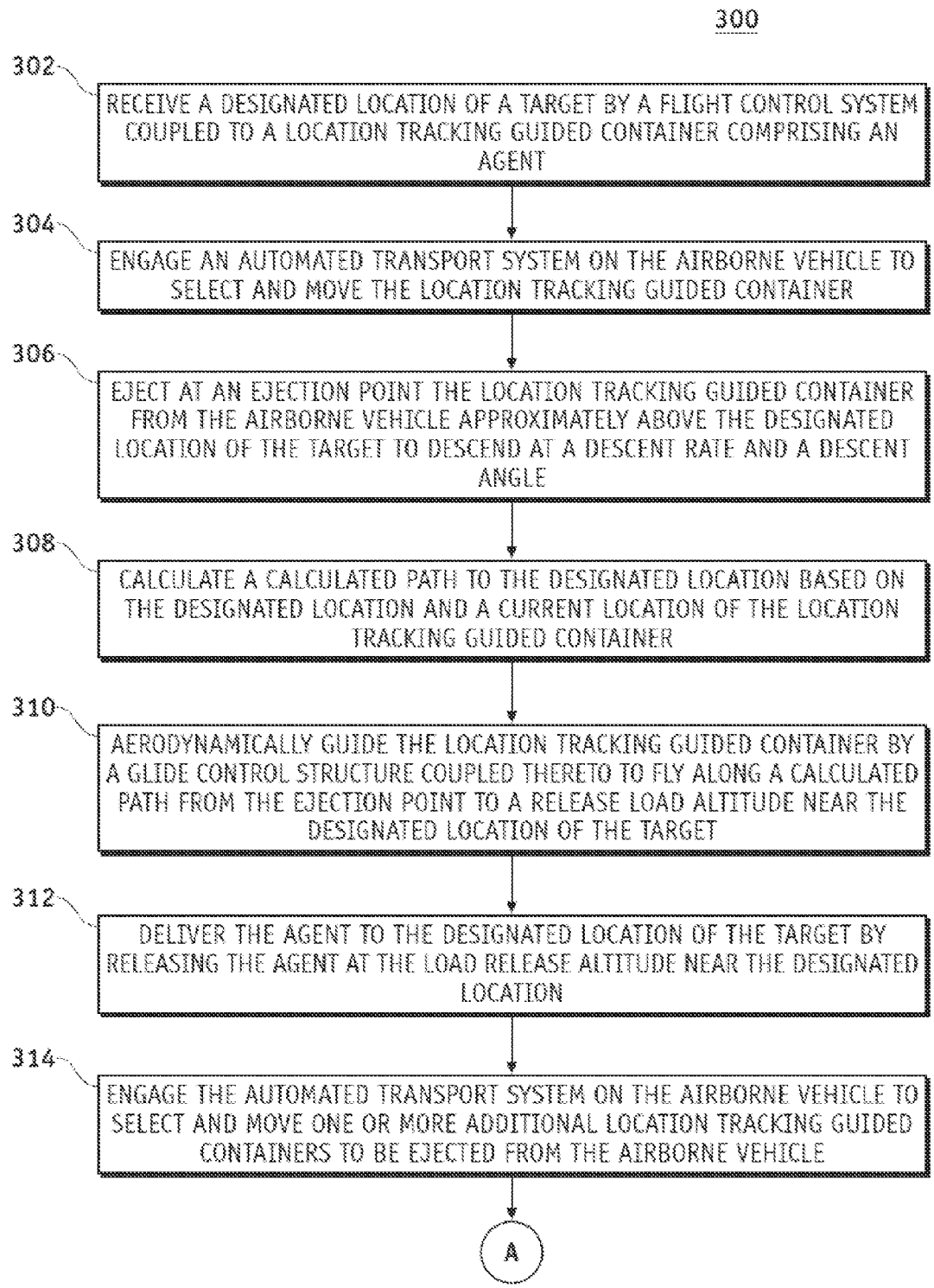
FIG. 3 is an illustration of an exemplary flowchart showing an air-deployable fire-fighting process according to an embodiment of the disclosure.
Figure 3B:
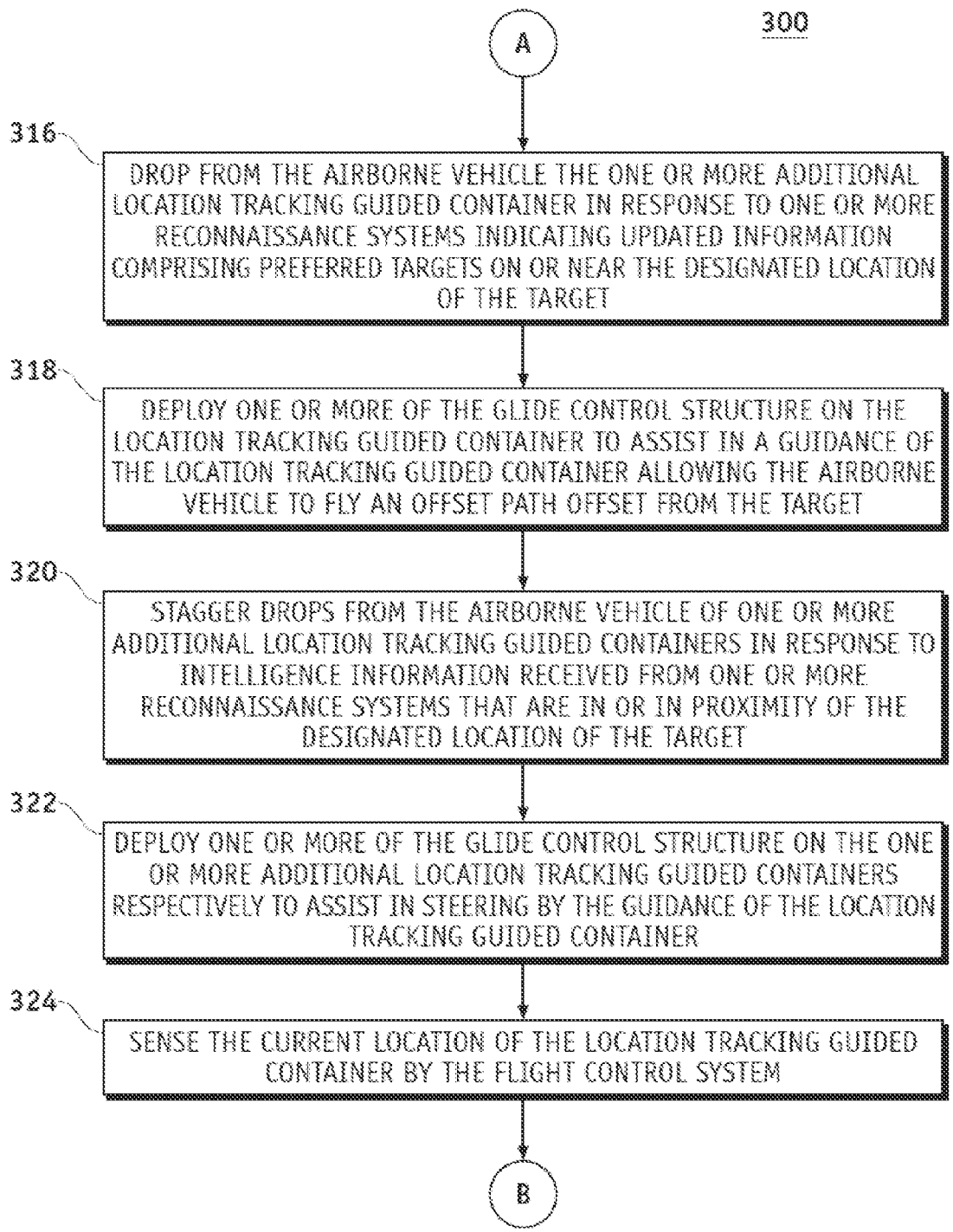
Figure 3C:
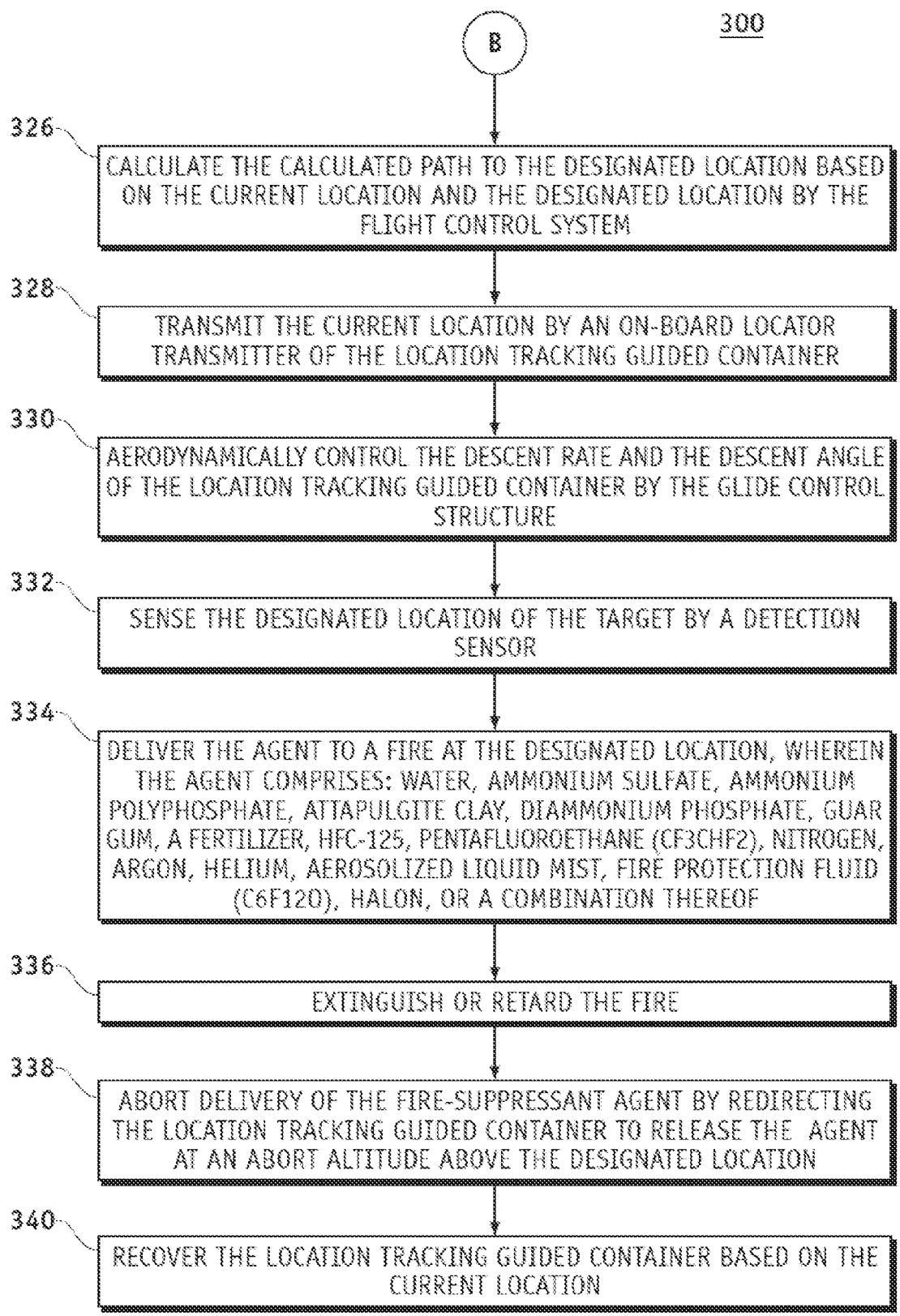

FIG. 3 is an illustration of an exemplary flowchart showing an air-deployable fire-fighting process according to an embodiment of the disclosure. The various tasks performed in connection with process 300 may be performed by software, hardware, firmware, computer-readable software, computer readable storage medium, a computer-readable medium comprising computer executable instructions for performing the process method, mechanically, or any combination thereof. The process 300 may be recorded in a computer-readable medium such as a semiconductor memory, a magnetic disk, an optical disk, and the like, and can be accessed and executed, for example, by a computer CPU such as a processor module in which a computer-readable medium is stored.

For illustrative purposes, the following description of process 300 may refer to elements mentioned above in connection with FIGS. 1-2. In some embodiments, portions of the process 300 may be performed by different elements of the system 200 such as: the location tracking guided fire-suppressant container 204 (container 204), the fire-suppression agent flow-control valve 208, the pallet 210, the balloon 214, the balloon gas supply source 216, the balloon gas valve actuator 218, the on-board locator transmitter 220, the radar altimeter 224, the flight control computer 234, the controller 236, the memory module 238, the on-board guidance system 240, the glide control structure 242, the flight control actuator 244, the fire detection sensor 248, the external communication link 250, etc.

It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Also, not all of the tasks shown in FIG. 3 need to be performed and some of the tasks may be omitted in some embodiments. Process 300 may comprise functions, material, and structures that are similar to the embodiments shown in FIGS. 1-2. Therefore, common features, functions, and elements may not be redundantly described here. Process 300 can be used to deliver a load or an agent to a target, but a fire-suppressant agent delivered to a location of a fire is described herein as an example.

Process 300 may begin by receiving a designated location such as the designated location 116 of a fire such as the fire 102 by a flight control system such as the flight control system 232 coupled to a location tracking guided fire-suppressant container such as the container 120/204 comprising a fire-suppressant agent such as the load 126/206 (task 302). The designated location 116 may be received from the external communication link 250.

In one embodiment (e.g., a three-part system), the off-board systems 246 may comprise a system that identifies the target site(s) 116 for one or more aircraft 104 and communicates the target site(s) 116 to the aircraft 104. A system within the aircraft 104 such as the aircraft communication system 114 then receives information pertaining to the target site(s) 116, assigns the target site(s) 116 to the respective container (s) 204, calculates a desired airplane flight path for the aircraft 104, calculates the (substantially optimal or best) ejection point 146 for the container(s) 204, and ejects the container(s) 204. Each of the containers 204 receive the information pertaining to target site(s) 116 from the aircraft communication system 114 via the on-board guidance system 240 and is ejected in midair by the ejector 122 at the ejection altitude 132. The container 204 then calculates a calculated flight path to the target site 116 and flies along the calculated flight path as explained above.

In another embodiment (e.g., a two-part system), an airplane-based system such as the aircraft communication system 114 performs its own target site identification, assigns the target site(s) 116 to the respective container(s) 120 (load delivery system), calculates the desired airplane flight path of the aircraft 104, calculates the (substantially optimal or best) ejection point 146 for the container(s) 204, and ejects the container(s) 204 by the ejector 122 at the ejection altitude 132. This embodiment may comprise a self-contained firefighting system.

Process 300 may continue by engaging an automated transport system such as the automated transport system 106 on an airborne vehicle such as the airborne vehicle 104 to select and move the location tracking guided fire-suppressant container 120/204 (task 304).

Process 300 may continue by ejecting at an ejection point such as the ejection point 146 the location tracking guided fire-suppressant container 120/204 from the airborne vehicle 104 approximately above the designated location 116 of the fire 102 to descend at a descent rate and a descent angle (task 306).

Process 300 may continue by calculating a calculated path to the designated location 116 based on the designated location 116 and a current location of the location tracking guided fire-suppressant container 120/204 (task 308).

Process 300 may continue by aerodynamically guiding the location tracking guided fire-suppressant container 120/204 by a glide control structure such as the glide control structure 242 coupled thereto to fly along a calculated path from the ejection point 146 to a predetermined altitude such as the load release altitude 138 near the designated location 116 of the fire 102 (task 308). The calculated path to at, near or in a proximity of the designated location 116 may be calculated based on the current location 254 and the designated location 116.

Process 300 may continue by delivering the fire-suppressant agent 126/206 to the designated location 116 of the fire 102 by releasing the fire-suppressant agent 126/206 at the load release altitude 138 near the designated location 116 (task 312).

Process 300 may continue by engaging the automated transport system 106 on the airborne vehicle 104 to select and move one or more additional location tracking guided fire-suppressant containers 120/204 to be ejected from the airborne vehicle 104 (task 314).

Process 300 may continue by dropping from the airborne vehicle 104 the one or more additional location tracking guided fire-suppressant container 120/204 in response to one or more reconnaissance system(s) 112 indicating updated information comprising preferred targets on or near the designated location 116 of the fire 102 (task 316). The suppressant is preferably delivered not to hot spots but instead to other locations such the favorable spots or preferred targets. The favorable spots may be comprise an area just ahead of the designated location 116 of the fire 102.

Process 300 may continue by deploying one or more of the glide control structure on the location tracking guided fire-suppressant container to assist in a guidance of the location tracking guided fire-suppressant container allowing the airborne vehicle to fly an offset path offset from the target (task 318). For example, the glide control structure permits the aircraft 104 to fly a path offset from the target area 116. For example, if the target sites 116 follow a linear fire front, the aircraft 104 can fly in a direction of this fire front but at some lateral offset. By this mechanism, it is possible to fly multiple drop aircraft along the fire front simultaneously by offsetting each airplane at a different lateral distance from the fire front. This prevents non-optimal distances between the drop aircraft such as the aircraft 104 while simultaneously addressing a relatively small or concentrated fire front. For example, the target area 116 may be a relatively small or concentrated fire front.

Process 300 may continue by staggering drops from the airborne vehicle 104 of one or more additional location tracking guided fire-suppressant containers 120/204 in response to intelligence information received from the one or more reconnaissance system(s) 112 that are in a proximity of the designated location 116 of the fire 102 (task 320).

Process 300 may continue by deploying one or more of the glide control structure(s) on the one or more additional location tracking guided fire-suppressant containers 120/204 respectively to assist in steering by the guidance of the location tracking guided fire-suppressant container (task 322).

Process 300 may continue by sensing the current location such as the current location 254 of the location tracking guided container 120/204 by the flight control system 232 (task 324).

Process 300 may continue by calculating the calculated path to the designated location 116 based on the current location 254 and the designated location 116 by the flight control system 232 (task 326)

Process 300 may continue by transmitting the current location 254 by an on-board locator transmitter such as the on-board locator transmitter 220 of the location tracking guided fire-suppressant container 120/204 (task 328).

Process 300 may continue by aerodynamically controlling the descent rate and the descent angle of the location tracking guided fire-suppressant container 120/204 by the glide control structure 242 (task 330).

Process 300 may continue by sensing the designated location 116 of the fire 102 by a fire detection sensor such as the fire detection sensor 248 (task 332).

Process 300 may continue by delivering the fire-suppressant agent 126/206 to the designated location 116 of the fire 102 wherein the fire-suppressant agent 126/206 comprises: water, ammonium sulfate, ammonium polyphosphate, attapulgite clay, diammonium phosphate, guar gum, a fertilizer, HFC-125, Pentafluoroethane (CF3CHF2), Nitrogen, Argon, Helium, aerosolized liquid mist, fire protection fluid ($C_6F_{12}O$), Halon, or a combination thereof (task 334). The fire-suppressant agent 126/206 may be delivered by dropping, spraying the fire-suppressant agent 126/206, or other method.

Process 300 may continue by extinguishing or retarding the fire (task 336).

Process 300 may continue by aborting delivery of the fire-suppressant agent 126/206 by redirecting the location tracking guided fire-suppressant container 120/204 to release the fire-suppressant agent 126/206 at an abort altitude such as the abort altitude 144 above the designated location 116 (task 338). For example, something may happen shortly after ejection that makes it non-optimal to drop the fire-suppressant agent 126/206 at the designated location 116 of the fire 102 (targeted location). Instead of redirecting the container 204, a signal to release the fire-suppressant agent 126/206 immediately at a high or higher altitude than previously intended may be sent, for example, from the reconnaissance system 112. This may result in a dispersion of the fire-suppressant agent 126/206 away the targeted location, thereby aborting delivery of the fire-suppressant agent at the abort altitude 144.

Process 300 may continue by recovering the location tracking guided fire-suppressant container based on the current location (task 340)

In this manner, various embodiments of the disclosure provide a system and method for a guided air-deployable load delivery.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", non-transitory computer readable storage medium, and the like may be used generally to refer to media such as, for example, memory, storage devices, or storage unit. These and other forms of computer-readable media may be involved in storing one or more instructions for use by the controller 236 each cause the controller 236 to perform specified operations respectively. Such instructions, generally referred to as "computer program code" or "program code" (which may be grouped in the form of computer programs or other groupings), when executed, enable a method of using the system 200.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for deployment operations from an airborne vehicle, the method comprising:
   receiving a designated location of a target by a flight control system coupled to a location tracking guided container comprising a fire-suppression agent;
   ejecting at an ejection point the location tracking guided container from the airborne vehicle approximately above the designated location of the target to descend at a descent rate and a descent angle;
   calculating during descent, by a processor in the location tracking guided container, a calculated path to the designated location based on the designated location and a current location of the location tracking guided container;
   aerodynamically guiding the location tracking guided container by a glide control structure coupled thereto under control of the processor in the location tracking guided container independent of the airborne vehicle to fly along the calculated path from the ejection point to a load release altitude near the designated location of the target,
   controlling an actuator to operate a first suppression agent flow-control valve to control a flow rate of the fire suppression agent based on an operational condition of the location tracking guided container; and
   delivering the fire-suppression agent to the designated location of the target by releasing the agent at the load release altitude near the designated location.

2. The method of claim 1,
   wherein the guide control structure controls the descent rate from about 30 MPH to about 200 MPH, and
   the guide control structure controls the descent angle from about 20 to about 90 degrees.

3. The method of claim 1, further comprising engaging an automated transport system on the airborne vehicle to first select and then move the location tracking guided container.

4. The method of claim 3, further comprising engaging the automated transport system on the airborne vehicle to first select and then move one or more additional location tracking guided containers to be ejected from the airborne vehicle.

5. The method of claim 4, further comprising dropping from the airborne vehicle to one or more additional location tracking guided containers in response to one or more reconnaissance systems indicating updated information comprising preferred targets on or near the designated location of the target.

6. The method of claim 1, further comprising deploying one or more of the glide control structure on the location tracking guided container to assist in a guidance of the location tracking guided container allowing the airborne vehicle to fly an offset path offset from the target.

7. The method of claim 6, further comprising staggering drops of one or more additional location tracking guided containers from the airborne vehicle in response to intelligence information received from one or more reconnaissance systems that are in a proximity of the designated location of the target.

8. The method of claim 6, further comprising deploying one or more of the glide control structure on the one or more additional location tracking guided containers respectively to assist in steering by guidance of the location tracking guided container.

9. The method of claim 1, further comprising:
   transmitting the current location of the location tracking guided container by an on-board locator transmitter of the location tracking guided container; and
   recovering the location tracking guided container based on the current location.

10. The method of claim 1, further comprising:
    sensing the current location of the location tracking guided container by the flight control system; and
    calculating the calculated path to the designated location based on the current location and the designated location by the flight control system.

11. The method of claim 1, further comprising delivering the agent to a fire at the designated location, wherein the agent comprises: water, ammonium sulfate, ammonium polyphosphate, attapulgite clay, diammonium phosphate, guar gum, a fertilizer, HFC-125, Pentafluoroethane (CF3CHF2), Nitrogen, Argon, Helium, aerosolized liquid mist, fire protection fluid (C5F120), Halon, or a combination thereof.

12. The method of claim 1, further comprising aborting delivery of the agent by redirecting the location tracking guided container to release the agent at an abort altitude.

13. The method of claim 1, wherein the airborne vehicle comprises an aircraft.

14. An air-deployable load delivery system, the system comprising:
    a location tracking guided container comprising a processor therein, the location tracking guided container operable to:
       receive a fire-suppression agent;
       eject at an ejection point from a platform at an ejection altitude approximately above a designated location;
       descend at a descent rate and a descent angle toward the designated location; and
       deliver the fire-suppression agent to the designated location by releasing the fire-suppression agent at a load release altitude near the designated location; and
    a glide control structure operable to aerodynamically control the location tracking guided container under control of the processor in the location tracking guided container independent of the platform to glide along a calculated path from the ejection point to the designated location, and
    an actuator that operates a first suppression agent flow-control valve to control a flow rate of the fire suppression agent based on an operational condition of the location tracking guided container,
    wherein the fire-suppression agent is delivered to the designated location of the target by releasing the agent at the load release altitude near the designated location.

15. The system of claim 14, further comprising a flight control computer coupled to the location tracking guided container and operable to:
    detect the designated location of a target from an off-board system;
    sense a current location of the location tracking guided container from a sensor coupled to the location tracking guided container; and calculate the calculated path to the designated location based on the current location and the designated location.

16. The system of claim 14, wherein the platform comprises an airborne vehicle, or an airborne aircraft.

17. The system of claim 14, wherein the platform comprises a bridge or a building.

18. The system of claim 14, further comprising a fire-suppression agent flow-control valve operable to control a distributed flow rate of the fire-suppression agent based on operational conditions.

19. A non-transitory computer readable storage medium comprising computer-executable instructions for air-deploying a load delivery system from a platform, the computer-executable instructions comprising code for:
receiving a target location via an on-board guidance system coupled to a guided container comprising a fire-suppression agent;
sensing a current location of the guided container;
calculating during descent, by a processor in the location tracking guided container, a calculated path to the target location based on the current location and the target location;
aerodynamically guiding the guided container by a glide control structure coupled thereto under control of the processor in the location tracking guided container independent of the airborne vehicle to glide along the calculated path to a load release altitude near the target location,
controlling an actuator to operate a first suppression agent flow-control valve to control a flow rate of the fire suppression agent based on an operational condition of the location tracking guided container, and
delivering the fire-suppression agent to the target location by releasing the load at the load release altitude near the target location.

20. The method of claim 1, further comprising filing filling the location tracking guided container with the fire-suppression agent prior to loading the location tracking guided container into the airborne vehicle.

21. The method of claim 1, wherein the glide control structure comprises: a steerable parachute, a Rogallo wing, or a balloon.

22. The method of claim 1, further comprising calibrating dispersion of the fire-suppression agent.

23. The method of claim 1, further comprising shaping a discharge of the fire-suppression agent in a linear distribution.

24. The method of claim 1, further comprising guiding landing of the location tracking guided container by a same glide control structure.

* * * * *